US012651861B2

(12) United States Patent
Takahashi

(10) Patent No.: US 12,651,861 B2
(45) Date of Patent: Jun. 9, 2026

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Keigo Takahashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 385 days.

(21) Appl. No.: 18/566,953

(22) PCT Filed: May 31, 2022

(86) PCT No.: PCT/JP2022/022063

§ 371 (c)(1),
(2) Date: Dec. 4, 2023

(87) PCT Pub. No.: WO2022/264799

PCT Pub. Date: Dec. 22, 2022

(65) Prior Publication Data

US 2024/0266776 A1 Aug. 8, 2024

(30) Foreign Application Priority Data

Jun. 18, 2021 (JP) ................................. 2021-101381

(51) Int. Cl.
*H01R 13/506* (2006.01)
*H01R 13/10* (2006.01)
*H01R 13/424* (2006.01)

(52) U.S. Cl.
CPC ........... *H01R 13/506* (2013.01); *H01R 13/10* (2013.01); *H01R 13/424* (2013.01)

(58) Field of Classification Search
None
See application file for complete search history.

(56) References Cited

U.S. PATENT DOCUMENTS 5,419,722 A 5/1995 Onoda
10,297,932 B2 * 5/2019 Maesoba ............ H01R 13/6477
(Continued)

FOREIGN PATENT DOCUMENTS

WO 2017/141669 A1 8/2017

OTHER PUBLICATIONS

International Search Report issued on Aug. 9, 2022 for WO 2022/264799 A1 (6 pages).

*Primary Examiner* — Ross N Gushi
(74) *Attorney, Agent, or Firm* — Venjuris, P.C.

(57) ABSTRACT

A connector (10) is provided with an inner module (11) including a plurality of terminal groups (22) to be respectively connected to a pair of electrically conductive paths (71) and each having a pair of terminals (60), and an outer housing (12) for accommodating the inner module (11). The outer housing (12) includes only one accommodation chamber (84) for accommodating the inner module (11). The inner module (11) includes an integrally configured inner housing (21) supporting the plurality of terminal groups (22). The inner housing (21) includes a front wall (48) to be arranged in front of the plurality of terminal groups (22). The front wall (48) is constituted by one member and formed with insertion openings (48A) at positions respectively corresponding to all the terminals (60).

8 Claims, 14 Drawing Sheets

(56) References Cited

U.S. PATENT DOCUMENTS

| | | | | |
|---|---|---|---|---|
| 10,511,116 | B2 * | 12/2019 | Maesoba ............ | H01R 13/4364 |
| 10,622,764 | B2 * | 4/2020 | Maesoba ................ | H01R 24/60 |
| 10,714,872 | B2 * | 7/2020 | Maesoba ............ | H01R 13/6463 |
| 10,763,600 | B2 * | 9/2020 | Maesoba ............ | H01R 13/6583 |
| 10,833,444 | B2 * | 11/2020 | Maesoba .............. | H01R 13/113 |
| 10,916,874 | B2 * | 2/2021 | Maesoba .............. | H01R 13/113 |
| 11,728,591 | B2 * | 8/2023 | Suzuki ............... | H01R 13/5208 439/587 |
| 11,791,594 | B2 * | 10/2023 | Maesoba .......... | H01R 13/65912 439/607.41 |
| 12,470,005 | B2 * | 11/2025 | Maesoba .............. | H01R 13/424 |
| 2015/0132994 | A1 | 5/2015 | Zebhauser et al. | |
| 2018/0102597 | A1 | 4/2018 | Maesoba et al. | |
| 2018/0254579 | A1 | 9/2018 | Miyamura et al. | |
| 2019/0199028 | A1 | 6/2019 | Maesoba et al. | |
| 2019/0252806 | A1 | 8/2019 | Maesoba et al. | |
| 2019/0288456 | A1 * | 9/2019 | Maesoba .............. | H01R 13/424 |
| 2020/0083633 | A1 | 3/2020 | Maesoba et al. | |
| 2020/0176908 | A1 | 6/2020 | Maesoba et al. | |
| 2022/0302618 | A1 | 9/2022 | Yamamura et al. | |
| 2024/0063570 | A1 * | 2/2024 | Saburi .................. | H01R 13/516 |
| 2024/0332842 | A1 * | 10/2024 | Osawa ............... | H01R 13/5208 |

* cited by examiner

CONNECTOR

CROSS REFERENCE TO RELATED APPLICATIONS

This application is a national phase of PCT application No. PCT/JP2022/022063, filed on 31 May 2022, which claims priority from Japanese patent application No. 2021-101381, filed on 18 Jun. 2021, all of which are incorporated herein by reference.

TECHNICAL FIELD

The present disclosure relates to a connector.

BACKGROUND

A connector disclosed in Patent Document 1 is provided with a terminal unit formed such that an inner conductor is accommodated in a dielectric and a housing including an accommodation chamber, into which the terminal unit is inserted. In the case of accommodating a plurality of terminal units in the housing, the configuration of a multiple insertion type connector, for example, disclosed in FIG. 1 of Patent Document 2 is thought. The multiple insertion type connector of Patent Document 2 is provided with an outer housing and insertion type connectors arranged in parallel in two upper and lower stages in the outer housing. Each insertion type connector includes an inner housing and a plurality of contact elements arranged in the inner housing. The contact elements are respectively crimped and connected to two cores of a twisted pair cable. The multiple insertion type connector of Patent Document 2 can be positioned in a vertical direction by arranging the insertion type connectors in the two upper and lower stages while laterally shifting the insertion type connectors.

PRIOR ART DOCUMENT

Patent Document

Patent Document 1: JP 2018-152215 A
Patent Document 2: JP 2015-528625 A

SUMMARY OF THE INVENTION

Problems to be Solved

A configuration in which insertion type connectors are arranged in the two upper and lower stages while being laterally shifted like the connector of Patent Document 2 tends to be enlarged in the lateral direction. If an attempt is made to align the positions in the lateral direction of the insertion type connectors arranged in the two upper and lower stage to solve this problem, it is necessary to provide a partition wall between the insertion type connectors, wherefore the multiple insertion type connector tends to be enlarged in the vertical direction. Further, each of a plurality of the insertion type connectors to be arranged in the outer housing may rattle in the outer housing. Thus, insertion openings, through which mating contact elements are inserted, may be shifted in position between the plurality of insertion type connectors arranged in parallel.

Accordingly, the present disclosure aims to provide a connector capable of reducing a size in an arrangement direction of a plurality of terminal groups and preventing insertion openings from being shifted in position.

Means to Solve the Problem

The present disclosure is directed to a connector with an inner module including a plurality of terminal groups to be respectively connected to a pair of electrically conductive paths and each having a pair of terminals and an outer housing for accommodating the inner module, the outer housing including only one accommodation chamber for accommodating the inner module, the inner module including an integrally configured inner housing supporting the plurality of terminal groups, the inner housing including a front wall to be arranged in front of the plurality of terminal groups, and the front wall being constituted by one member, the front wall being formed with insertion openings at positions respectively corresponding to all the terminals.

Effect of the Invention

According to the present disclosure, it is possible to reduce a size in an arrangement direction of a plurality of terminal groups and prevent insertion openings from being shifted in position.

DETAILED DESCRIPTION TO EXECUTE THE INVENTION

Description of Embodiments of Present Disclosure

Figure 1:
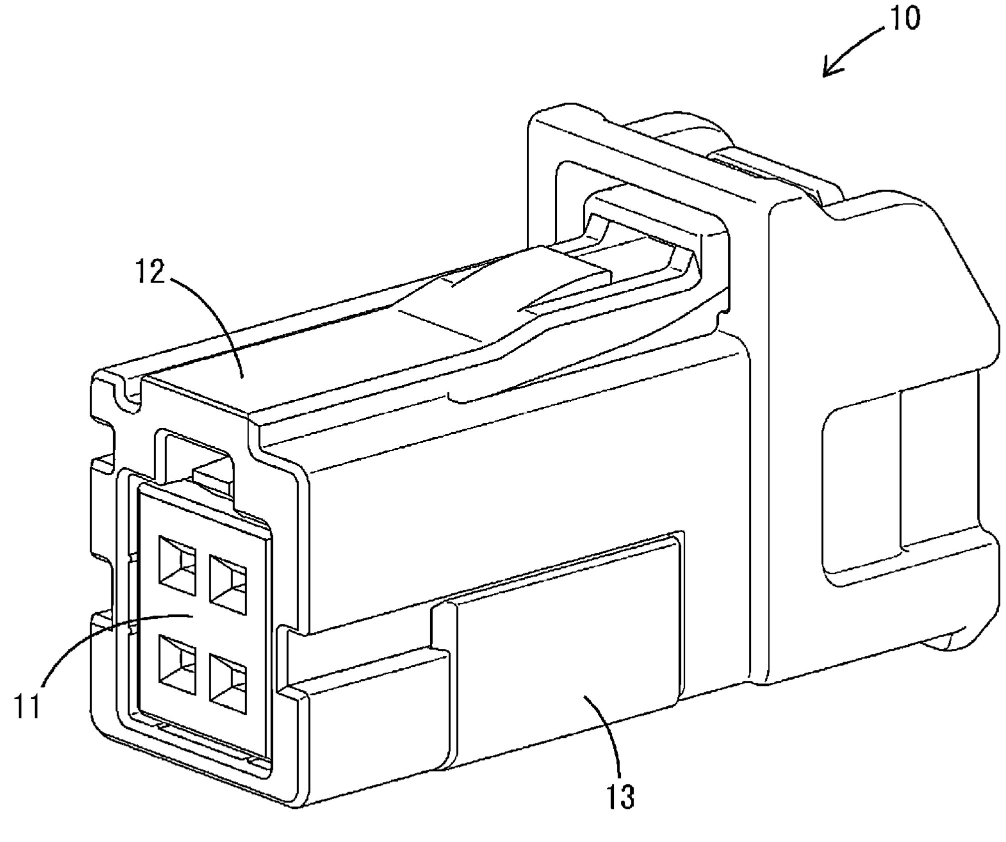
FIG. 1 is a perspective view of a connector.

First, embodiments of the present disclosure are listed and described.

(1) The connector of the present disclosure is provided with an inner module including a plurality of terminal groups to be respectively connected to a pair of electrically conductive paths and each having a pair of terminals and an outer housing for accommodating the inner module, the outer housing including only one accommodation chamber for accommodating the inner module, the inner module including an integrally configured inner housing supporting the plurality of terminal groups, the inner housing including a front wall to be arranged in front of the plurality of terminal groups, and the front wall being constituted by one member, the front wall being formed with insertion openings at positions respectively corresponding to all the terminals.

According to this configuration, since the outer housing is configured to accommodate the inner module including the plurality of terminal groups in the single accommodation chamber, it is not necessary to provide a wall for partitioning a space in the accommodation chamber (wall for partitioning the plurality of terminal groups in an arrangement direction) to separately accommodate the plurality of terminal groups. Thus, a size in the arrangement direction of the plurality of terminal groups can be reduced. Further, since the insertion openings corresponding to all the terminals are formed in one member according to this configuration, position shifts of the insertion openings can be prevented.

(2) Preferably, the inner housing includes a base member for partitioning the plurality of terminal groups and a pair of cover members to be assembled with the base member to sandwich the base member from both sides, each of the pair of cover members includes a locking portion, the base member includes a first lock receiving portion to be locked by the locking portion of one of the pair of cover members and a second lock receiving portion to be locked by the locking portion of the other cover member, and the first and second lock receiving portions have tapered surfaces inclined in mutually opposite directions.

According to this configuration, an operation of assembling the pair of cover members with the base member from mutually opposite directions can be facilitated.

(3) Preferably, the base member includes a guide portion provided along an assembly direction of the cover members.

According to this configuration, the cover member can be guided by the guide portion in assembling the cover member with the base member.

(4) Preferably, the locking portion of the cover member is comb-shaped.

According to this configuration, even if the inner housing is small in size, the cover member is locked to the base member at a plurality of positions. Therefore, the cover member is hardly detached even if a force is applied in a direction to separate the cover member and the base member from each other.

(5) Preferably, the first and second lock receiving portions are arranged in such a positional relationship as to be point-symmetrical with each other in a front view.

According to this configuration, the pair of cover members can be members common to each other.

(6) Preferably, the inner housing includes a base member having a partitioning portion for partitioning the plurality of terminal groups and a pair of cover members to be assembled with the base member to sandwich the base member from both sides, and the cover member includes a locking portion to be locked to the base member and a deflection restricting portion connected to the locking portion and located to sandwich a cable connected to the terminal group between the partitioning portion and the deflection restricting portion.

According to this configuration, the deflection of the cable toward a side opposite to the partitioning portion can be restricted.

(7) Preferably, the terminal group includes a crimping portion to be crimped to the cable, and the cover member includes a fitting hole in front of the deflection restricting portion, the crimping portion being fit into the fitting hole.

According to this configuration, the cable connected to the terminal group can be suppressed from coming out rearward by fitting the crimping portion into the fitting hole.

Details of Embodiment of Present Disclosure

Embodiment

One specific embodiment of a connector of the present disclosure is described with reference to FIGS. 1 to 14. In this embodiment, upper and lower sides shown in FIGS. 1 to 4 and 7 to 13 are directly defined as upper and lower sides concerning a vertical direction. Left and right sides shown in FIGS. 1 to 11 and 13 are respectively defined as front and rear sides concerning a front-rear direction. Left and right sides when the connector is viewed from front are respectively defined as left and right sides concerning a lateral direction.

(Configuration of Connector)

Figure 2:
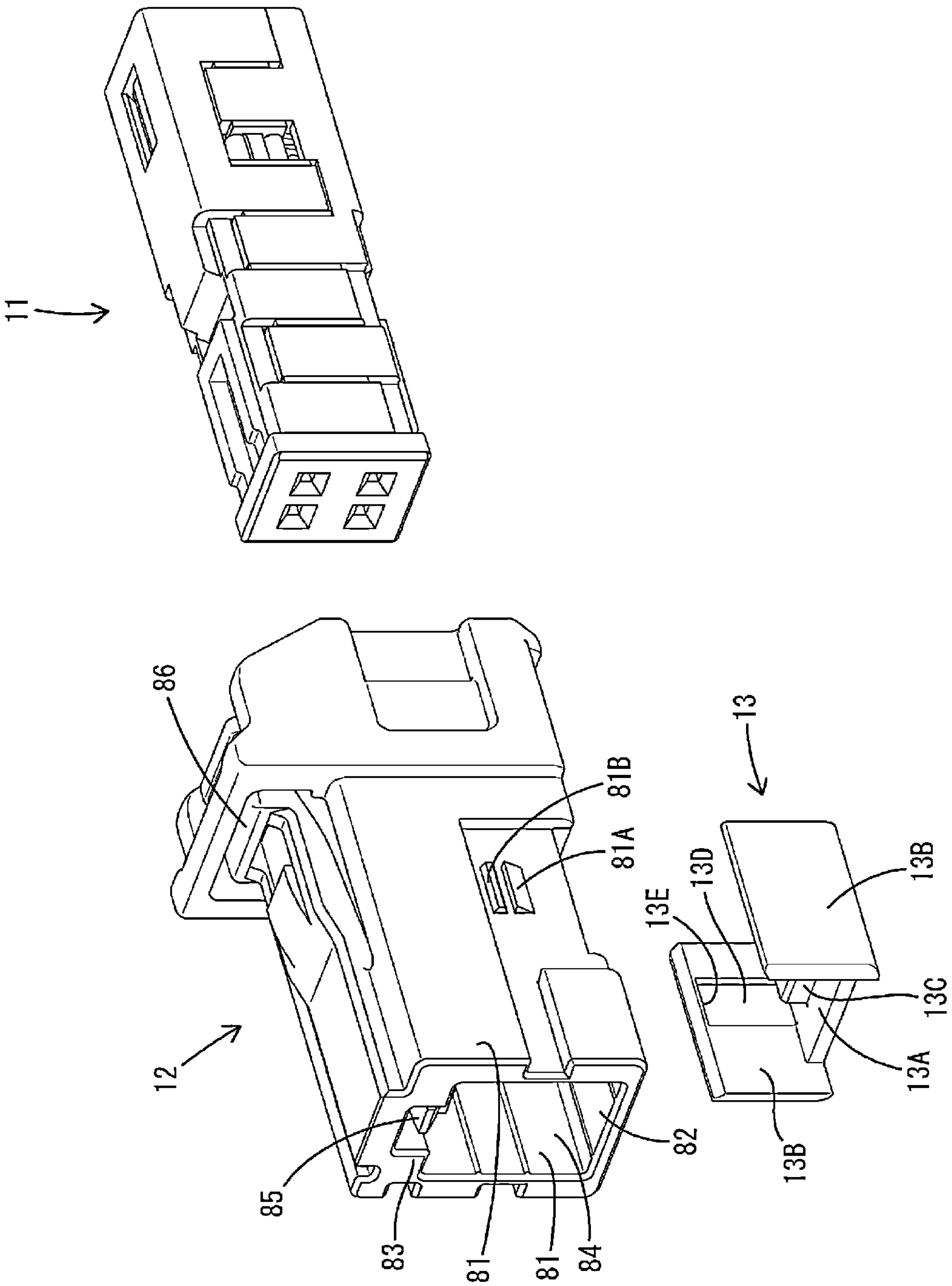
FIG. 2 is a perspective view of an outer housing, an inner module and a retainer.
Figure 3:
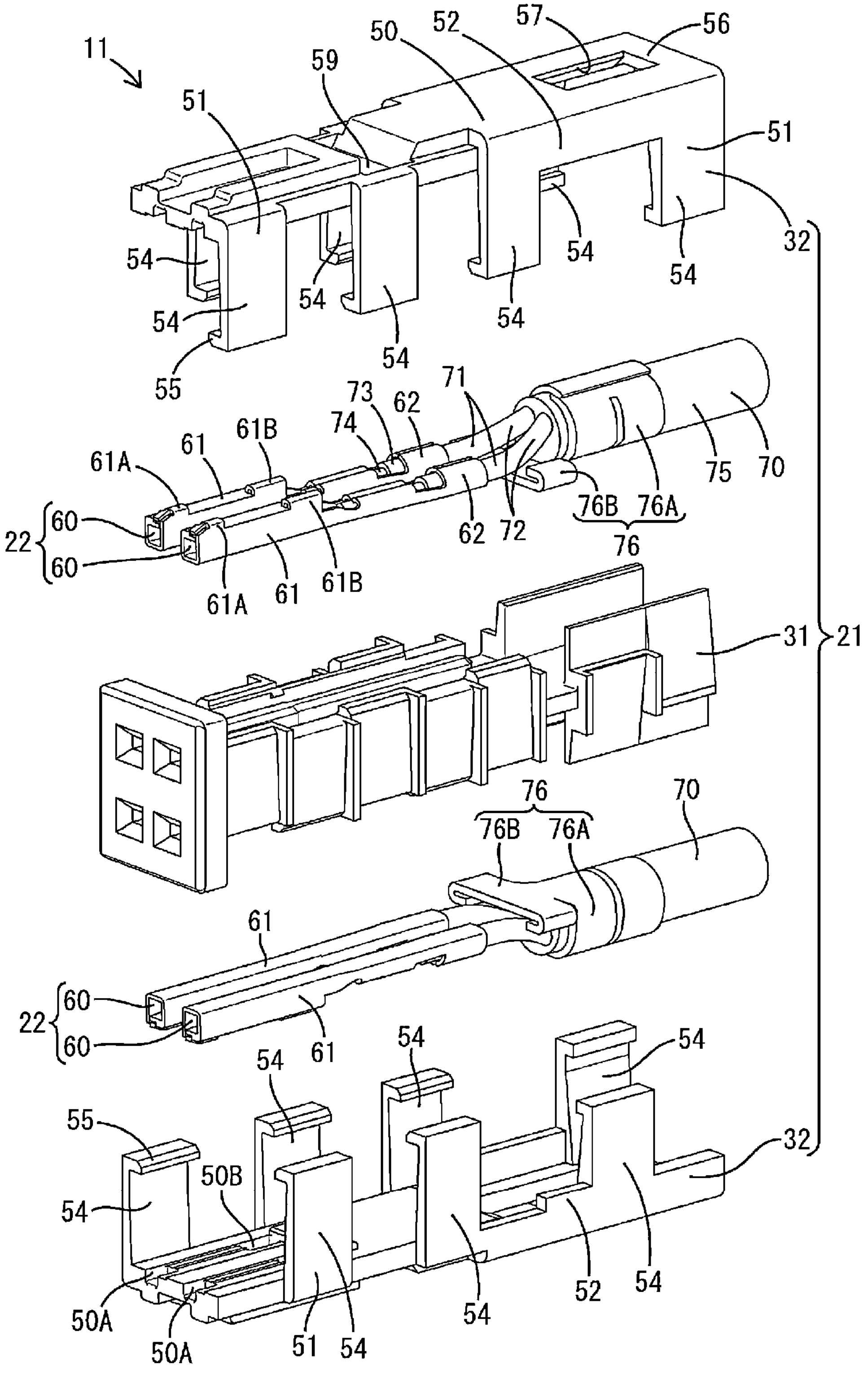
FIG. 3 is an exploded perspective view of the inner module.

A connector 10 of this embodiment shown in FIG. 1 is configured as a branch connector to be, for example, connected to the middle of a trunk harness. As shown in FIG. 2, the connector 10 is provided with an inner module 11, an outer housing 12 and a retainer 13. The inner module 11 is accommodated into the outer housing 12. As shown in FIG. 3, the inner module 11 is provided with an inner housing 21 and a pair of terminal groups 22. The number of the terminal groups 22 is equal to the number of electrically conductive paths constituting the trunk harness.

As shown in FIG. 3, the inner housing 21 is provided with one base member 31 constituted by a single component and a pair of cover members 32. The inner housing 21 is integrally configured by assembling the pair of cover members 32 with the base member 31 from both upper and lower sides of the base member 31. That is, in this embodiment, the vertical direction corresponds to an assembly direction of the base member 31. The base member 31 and the cover members 32 are, for example, components made of an insulating material such as synthetic resin. The inner housing 21 supports the pair of terminal groups 22 and is integrally constituted as the inner module 11 together with the pair of terminal groups 22.

Figure 4:
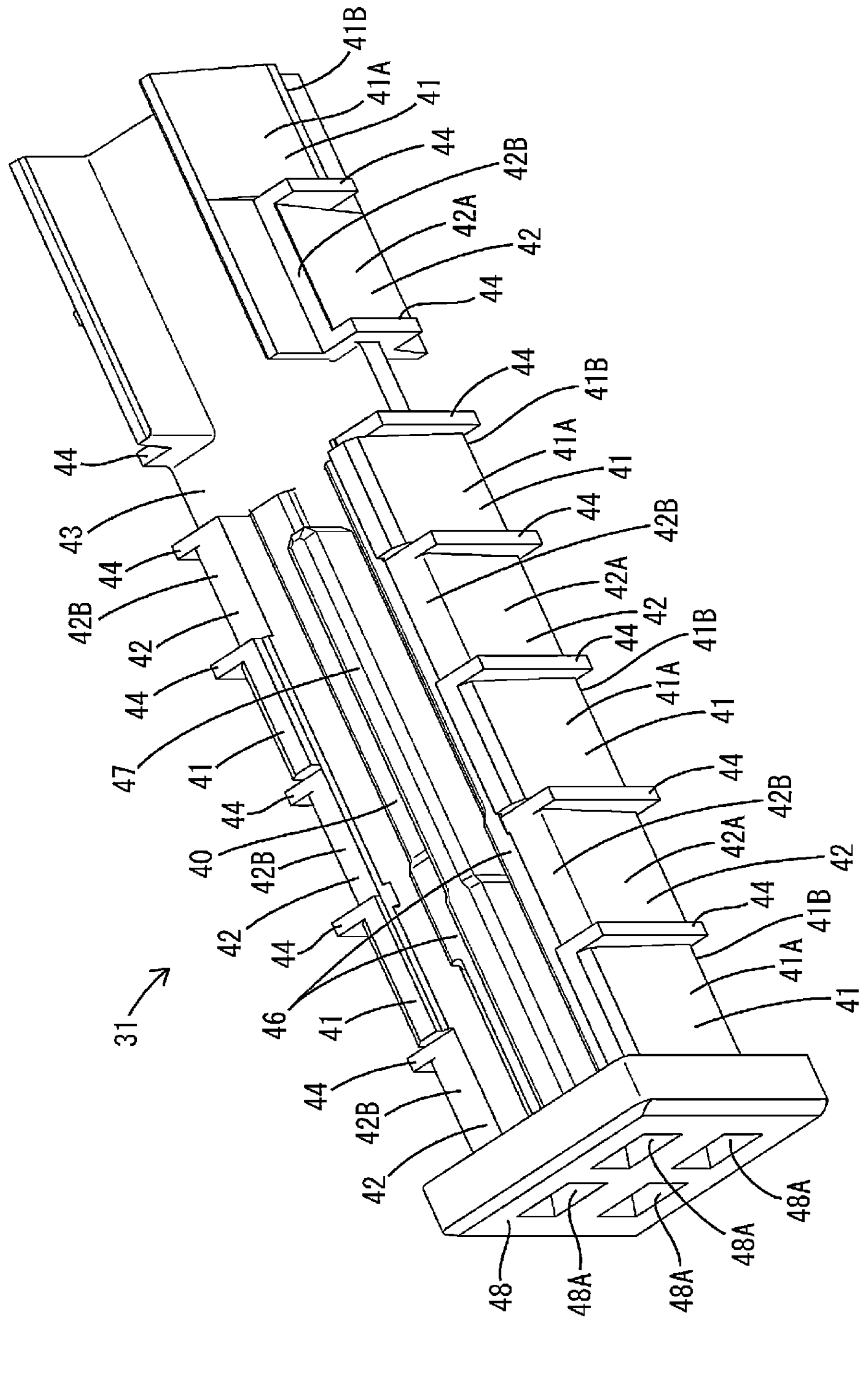
FIG. 4 is a perspective view of a base member.
Figure 5:
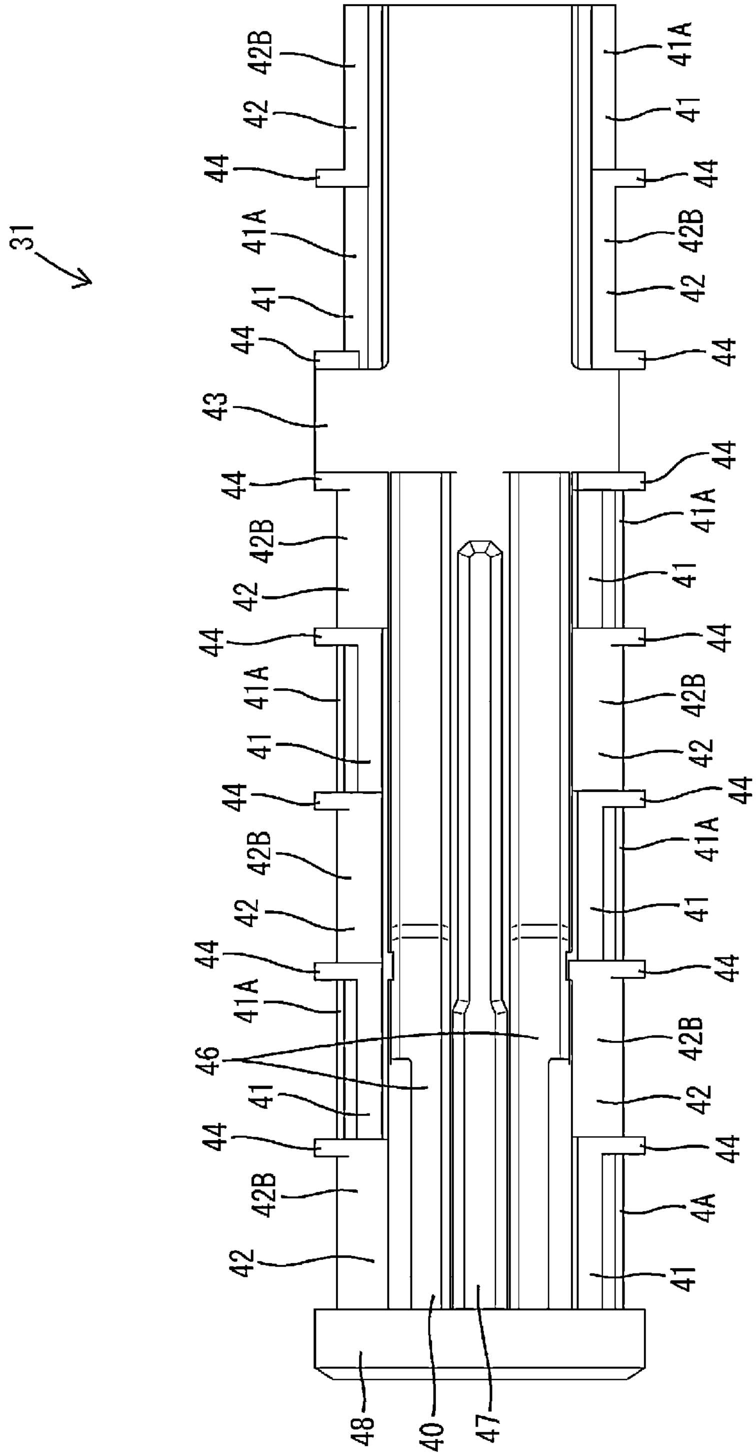
FIG. 5 is a plan view of the base member.
Figure 6:
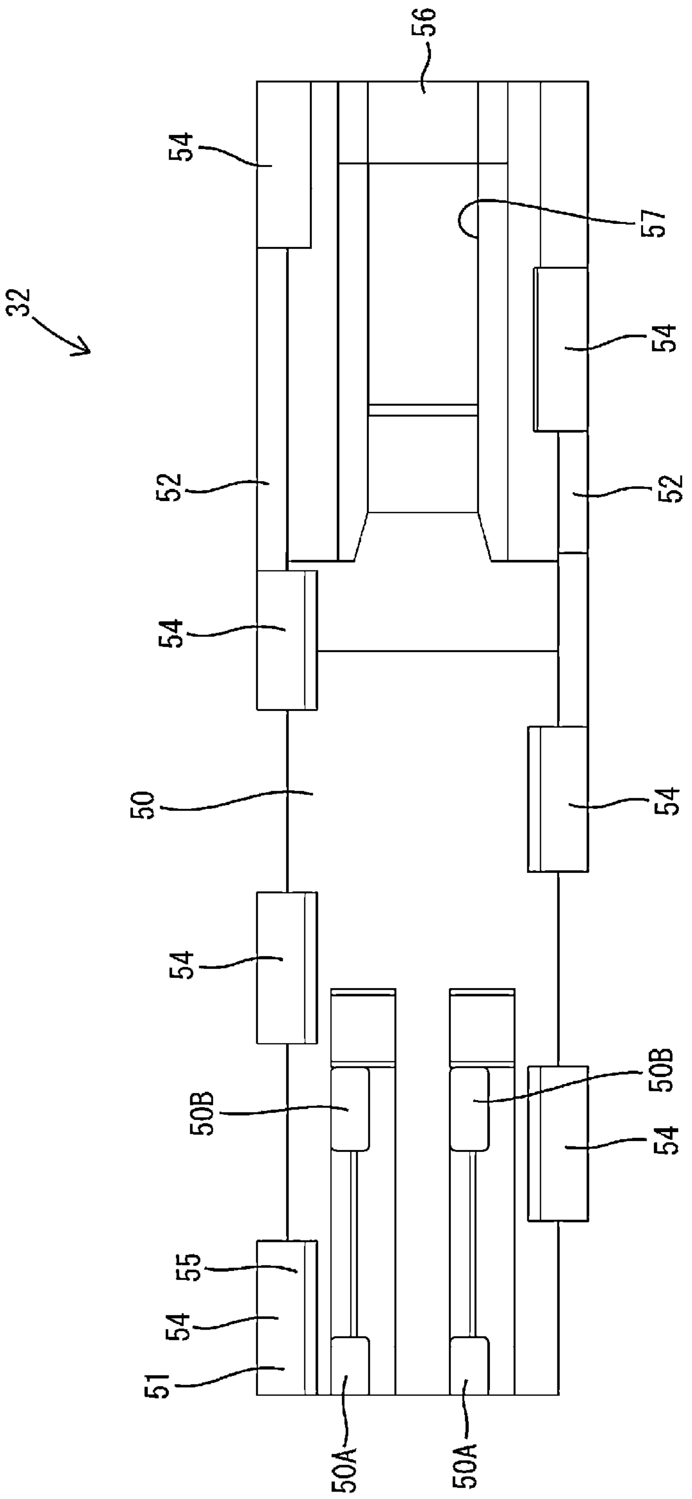
FIG. 6 is a bottom view of a cover member.

As shown in FIGS. 4 and 5, the base member 31 includes a partitioning portion 40 for partitioning between the pair of terminal groups 22. The partitioning portion 40 is plate-like and arranged with plate surfaces facing in the vertical direction. The partitioning portion 40 extends in the front-rear direction.

As shown in FIGS. 4 and 5, the base member 31 includes first lock receiving portions 41 and second lock receiving portions 42 provided on both left and right sides of the partitioning portion 40. The first and second lock receiving portions 41, 42 are respectively formed to extend both upward and downward from the both left and right sides of the partitioning portion 40. The first and second lock receiving portions 41, 42 are alternately arranged in the front-rear direction. The first and second lock receiving portions 41, 42 are arranged in such a positional relationship as to be point-symmetrical with each other in a front view from front (direction orthogonal to an assembly direction of the cover members 32 with the base member 31).

Figure 12:
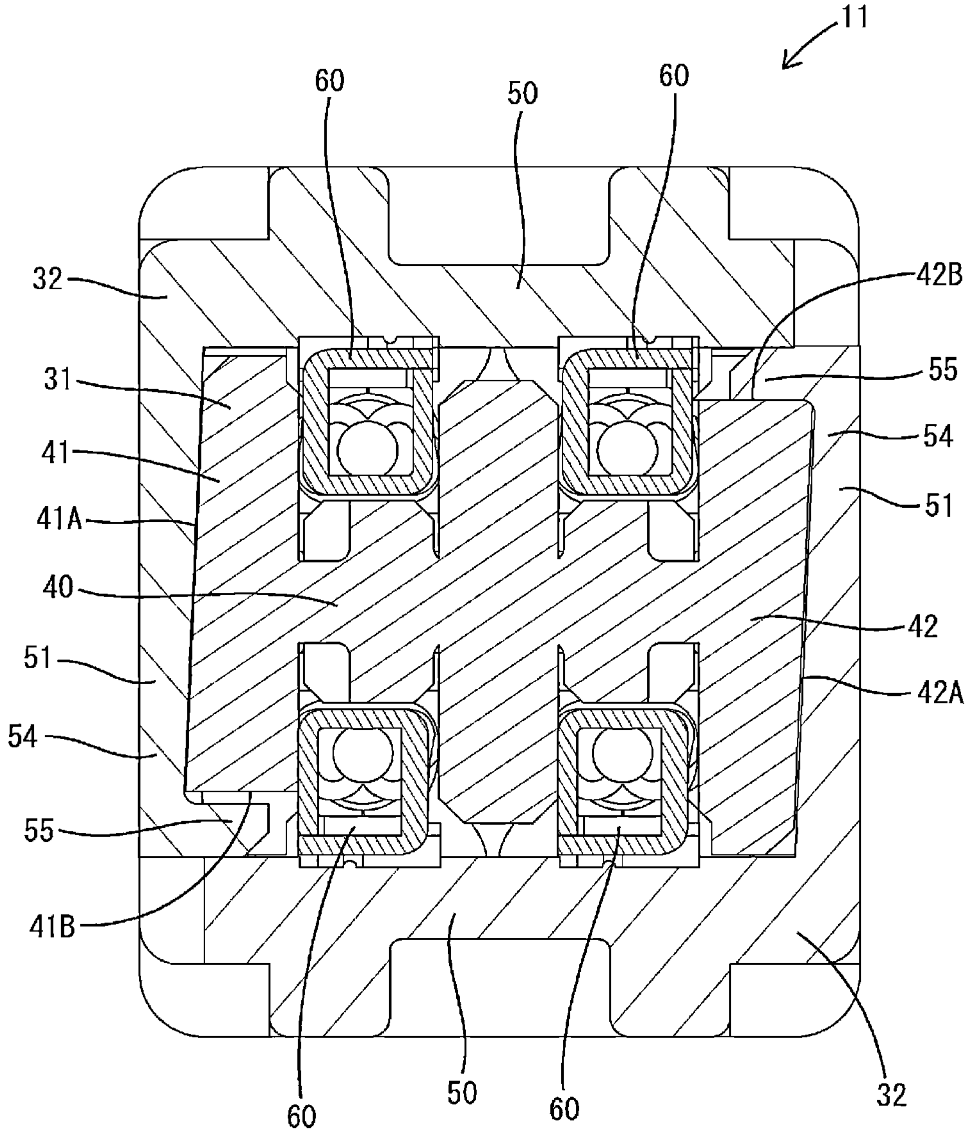
FIG. 12 is a front view in section of the inner module.

The first lock receiving portions 41 on the both left and right sides have first tapered surfaces 41A inclined along the assembly direction on outer side surfaces as shown in FIGS. 4 and 12. The second lock receiving portions 42 on the both left and right sides have second tapered surfaces 42A inclined along the assembly direction on outer side surfaces as shown in FIGS. 4 and 12. The first tapered surfaces 41A are inclined inward in the lateral direction toward an upper side, and the second tapered surfaces 42A are inclined inward in the lateral direction toward a lower side. The first and second tapered surfaces 41A, 42A intersect when viewed from front.

As shown in FIGS. 4 and 12, the first lock receiving portion 41 has a first lock receiving surface 41B. As shown in FIGS. 4 and 12, the second lock receiving portion 42 has a second lock receiving surface 42B. The first and second lock receiving portions 41, 42 are deviated from each other in the vertical direction, and claw portions 55 of the cover members 32 are fit to the first and second lock receiving surfaces 41B, 42B formed by this deviation.

As shown in FIGS. 4 and 5, the base member 31 includes crimp ring fitting grooves 43, into which crimp rings 76 are fit. The crimp ring fitting grooves 43 are formed on both upper and lower sides of the partitioning portion 40 and extend along the lateral direction. The crimp ring fitting grooves 43 are arranged between the first and second lock receiving portions 41, 42 arranged in the front-rear direction.

As shown in FIGS. 4 and 5, the base member 31 includes guide portions 44 provided along the assembly direction of the cover members 32. The guide portion 44 is provided on the first or second tapered surface 41A, 42A. The guide portions 44 are provided on all the first and second tapered surfaces 41A, 42A on the both left and right sides.

As shown in FIGS. 4 and 5, the base member 31 includes terminal accommodation grooves 46 formed on the both upper and lower sides of the partitioning portion 40. The terminal accommodation groove 46 is long in the front-rear direction and open outward in the vertical direction. Two terminal accommodation grooves 46 are provided laterally side by side. The two laterally arranged terminal accommodation grooves 46 are defined by the partitioning portion 40, the first and second lock receiving portions 41, 42 on the both left and right sides and a separation wall 47 arranged between the two laterally arranged terminal accommodation grooves 46.

As shown in FIGS. 4 and 5, the base member 31 includes a front wall 48 in front of the terminal accommodation grooves 46. The front wall 48 has a rectangular shape when viewed from front. The front wall 48 is connected to a front end part of the partitioning portion 40. The front wall 48 is formed with a plurality of insertion openings 48A penetrating through the front wall 48 in the front-rear direction. The plurality of insertion openings 48A are respectively provided to correspond to all the terminal accommodation grooves 46. That is, the plurality of insertion openings 48A are respectively provided to correspond to all terminals 60 arranged in all the terminal accommodation grooves 46. The front wall 48 is entirely constituted by one member.

As shown in FIG. 3, the cover member 32 includes a plate-like cover body 50, locking portions 51 extending upward or downward from both left and right sides of the cover body 50 and crimp ring restricting portions 52.

The cover body 50 is long in the front-rear direction and arranged with plate surfaces facing in the vertical direction. Front retaining recesses 50A and rear retaining recesses 50B are formed in the inner side surface of the cover body 50. The rear retaining recesses 50B are arranged behind the front retaining recesses 50A.

As shown in FIG. 3, the locking portions 51 have a comb-like shape projecting upward or downward from the both left and right sides of the cover body 50. The locking portions 51 include locking arms 54 extending upward or downward from the both left and right sides of the cover body 50. A plurality of the locking arms 54 are provided at intervals along the front-rear direction. The locking arm 54 is plate-like and arranged with plate surfaces facing in the lateral direction. The claw portion 55 is provided on a tip part of the locking arm 54. A tip side of the locking arm 54 is deflected and deformed with a base end side as a fixed end. The locking arms 54 are alternately arranged on the left and right sides in the front-rear direction.

Figure 8:
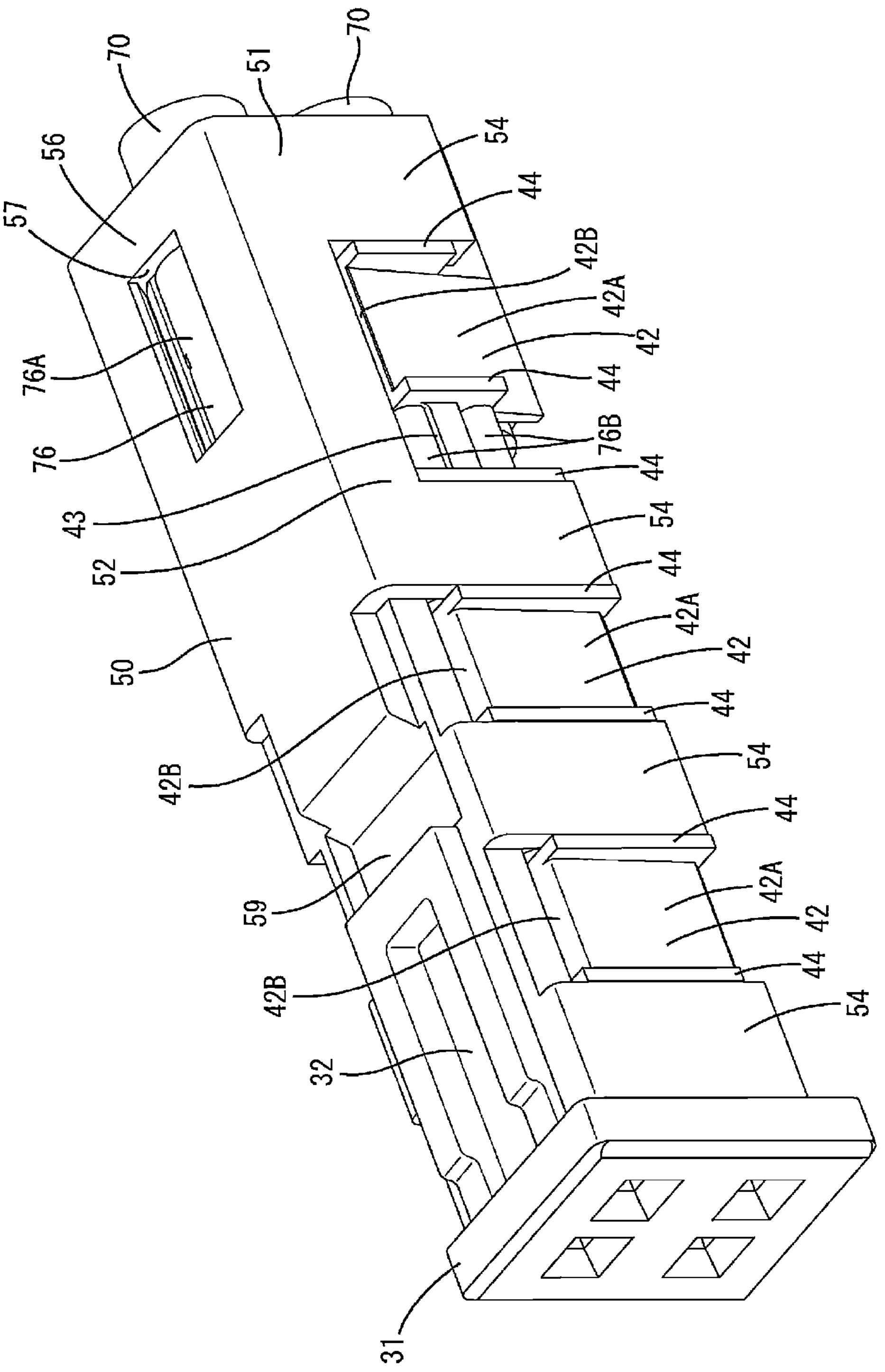
FIG. 8 is a perspective view in a state where the cover member is assembled on one side of the base member.

As shown in FIG. 8, the crimp ring restricting portions 52 sandwich the crimp ring 76 between the bottom surface of the crimp ring fitting groove 43 and the crimp ring restricting portions 52 in the vertical direction and restrict a movement in the vertical direction.

As shown in FIG. 8, the cover body 50 includes a deflection restricting portion 56 in a rear end part. The deflection restricting portion 56 is connected to the locking portions 51, more specifically the locking arms 54. The deflection restricting portion 56 extends in the lateral direction from base end parts of the locking arms 54 and is arranged on a side opposite to the partitioning portion 40 across a cable 70.

As shown in FIG. 8, the cover body 50 includes a fitting hole 57 in front of the deflection restricting portion 56. A crimping portion 76A of the crimp ring 76 is fit into the fitting hole 57.

As shown in FIG. 3, the terminal group 22 is provided with a pair of the terminals 60. The terminal 60 has a shape elongated in the front-rear direction as a whole. A rectangular tube portion 61 is formed in a front end part of the terminal 60, and a terminal-side crimping portion 62 in the form of an open barrel is formed in a rear end part of the terminal 60. The terminal-side crimping portion 62 is conductively fixed to a divided portion 72 of an electrically conductive path 71 by crimping. Although not shown, a pair of the electrically conductive paths 71 are configured as twisted pair cables. A front stabilizer 61A projecting in a direction perpendicular to the front-rear direction is formed on a front end part of the rectangular tube portion 61. A rear stabilizer 61B projecting in the direction perpendicular to the front-rear direction is formed on a rear end part of the rectangular tube portion 61.

As shown in FIG. 3, the terminal-side crimping portion 62 is conductively fixed to the divided portion 72 of the electrically conductive path 71. Branched parts in each electrically conductive path 71 serve as the divided portions 72 dividing each electrically conductive path 71. In the divided portion 72, an insulation coating 73 is removed to expose a conductor 72. A pair of the conductors 74 covered by the insulation coatings 73 are collectively surrounded by a sheath 75, whereby the cable 70 is configured. The cable 70 is provided with the crimp ring 76 mounted on an end part of the sheath 75. The crimp ring 76 includes the crimping portion 76A to be crimped to parts of the divided portions 72 and a positioning portion 76B projecting further outward in the lateral direction than the divided portions 72. The terminals 60 fixed to the electrically conductive path 71 linearly extend from the divided portions 72 of the electrically conductive path 71.

Figure 7:
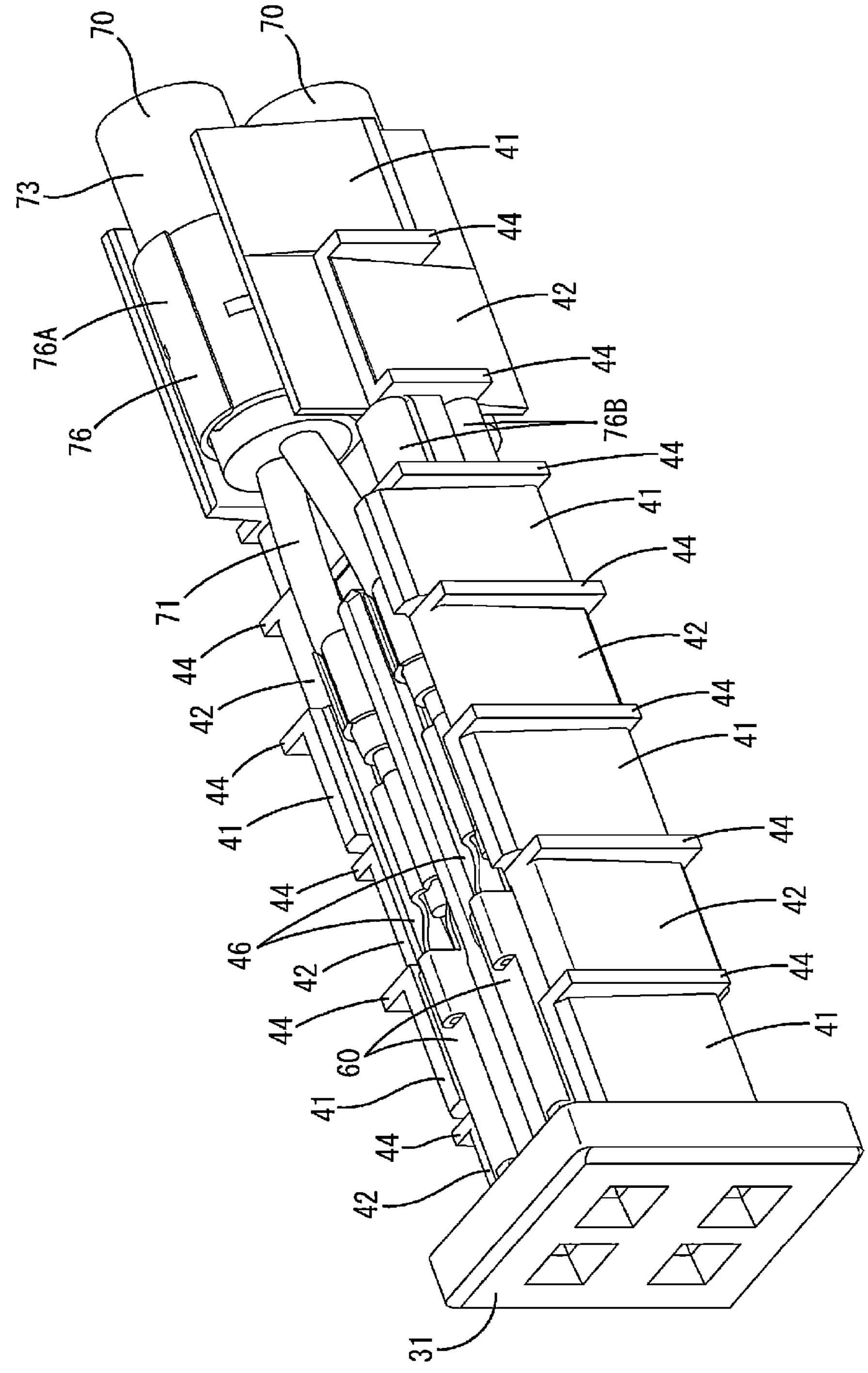
FIG. 7 is a perspective view in a state where terminal groups are assembled with the base member.
Figure 10:
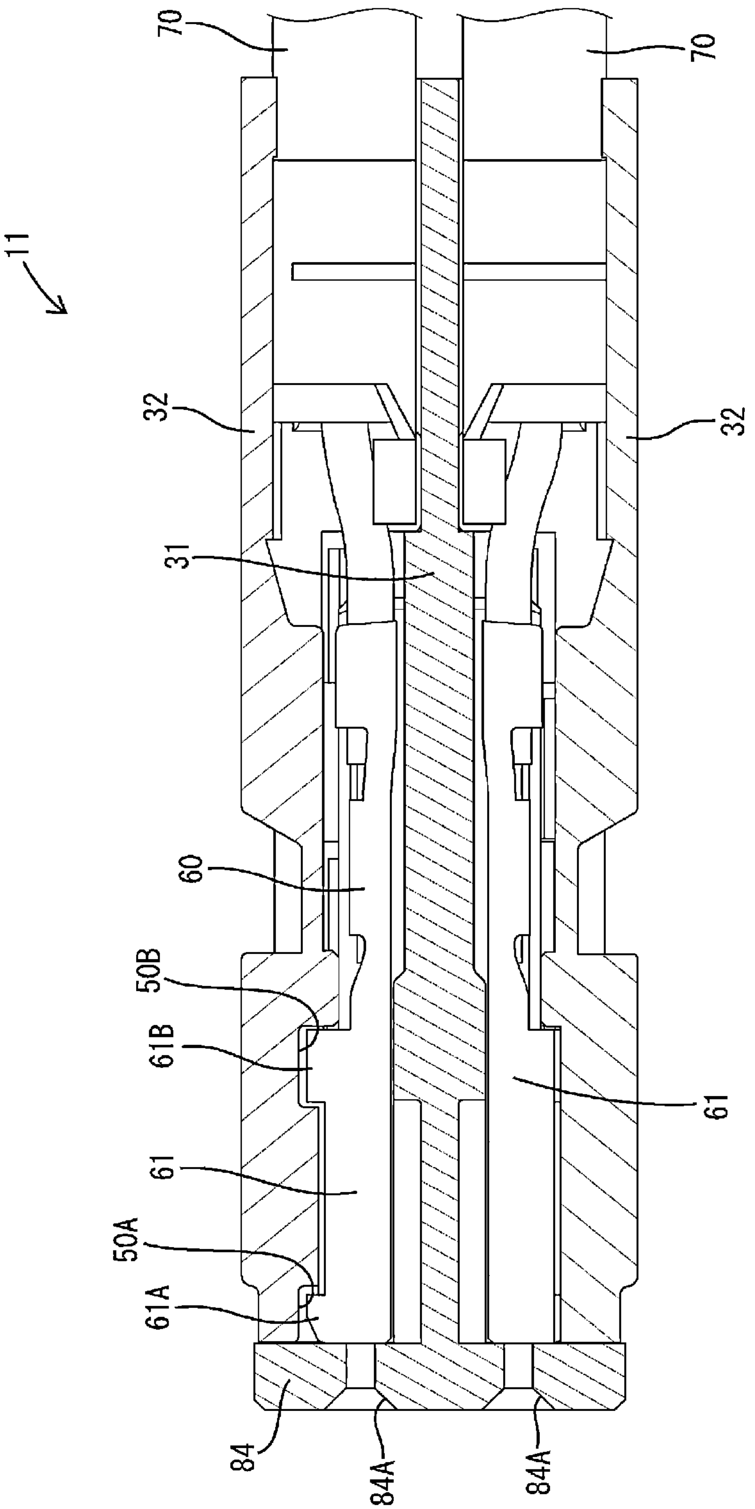
FIG. 10 is a side view in section of the inner module cut along a virtual plane passing through front and rear stabilizers.

As shown in FIG. 7, the terminals 60 are accommodated into the terminal accommodation grooves 46 of the base member 31. As shown in FIG. 10 the upper terminal 60 is supported in the inner housing 21 while being vertically inverted with respect to the lower terminal 60.

The outer housing 12 is, for example, a single component in the form of a rectangular tube made of an insulating material such as synthetic resin. As shown in FIG. 2, the outer housing 12 includes a pair of bilaterally symmetrical side wall portions 81, a bottom wall portion 82 coupling the lower end edges of the side wall portions 81 on both left and right sides and an upper wall portion 83 coupling the upper end edges of the side wall portions 81 on the both left and right sides. The outer housing 12 includes only one accommodation chamber 84 for accommodating the inner module 11. The accommodation chamber 84 is provided inside the outer housing 12. Both front and rear ends of the accommodation chamber 84 are open to the outside of the outer housing 12. The inside of the accommodation chamber 84 is not partitioned by a partition wall or the like.

As shown in FIG. 2, a first locked portion 81A and a second locked portion 81B are provided on the outer surface (surface opposite to the other side wall portion 81) of each of the side wall portions 81 on the both left and right sides. The first and second locked portions 81A, 81B project outward in the lateral direction (toward a side opposite to the other side wall portion 81). The first locked portion 81A is provided apart and below the second locked portion 81B. A retainer-side locking portion 13E of the retainer 13 to be described later is locked to the first and second locked portions 81A, 81B.

Figure 13:
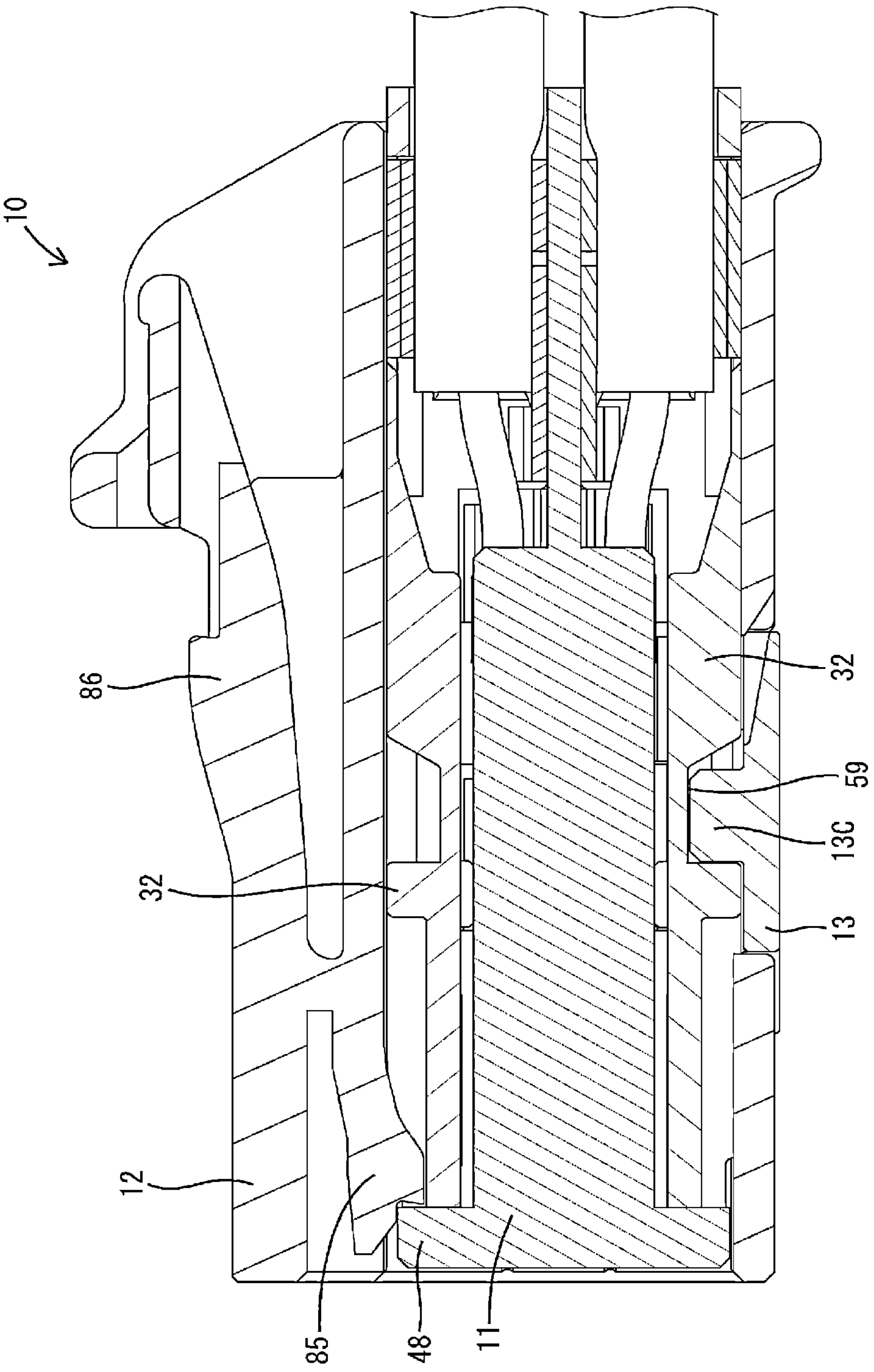
FIG. 13 is a side view in section of the connector.

As shown in FIG. 13, a resilient retaining piece 85 is formed on the inner surface of the upper wall portion 83. The resilient retaining piece 85 is resiliently and relatively displaceable in the vertical direction with respect to the upper wall portion 83. The outer housing 12 is formed with a lock arm 86 spaced apart from and covering the outer surface of the upper wall portion 83. The lock arm 86 is cantilevered rearward from a front end part of the outer housing 12 and resiliently deformable.

As shown in FIG. 2, the retainer 13 includes a bottom wall 13A and a pair of side walls 13B. The pair of side walls 13B rise upward from both left and right ends of the bottom wall 13A. A retainer-side protrusion 13 projecting upward is provided on the upper surface of the bottom wall 13A. A retainer-side recess 13D recessed outward (toward a side opposite to the other side wall 13B) is provided in the inner surface (surface opposite to the other side wall 13B) of the side wall 13B. The upper end of the retainer-side recess 13D serves as the retainer-side locking portion 13E to be hooked to the first or second locked portion 81A, 81B. By locking the retainer-side locking portions 13E to the first locked portions 81A, the retainer 13 is temporarily locked to the outer housing 12. By locking the retainer-side locking portions 13E to the second locked portions 81B, the retainer 13 is completely locked to the outer housing 12.

(Assembly of Connector)

Next, the assembly of the connector 10 is described. As shown in FIG. 7, the terminal groups 22 connected to the cables 70 are assembled with the base member 31. The terminals 60 are inserted into openings of the terminal accommodation grooves 46 in such a posture extending along an extending direction (front-rear direction) of the terminal accommodation grooves 46 (posture shown in FIG. 3). The positioning portions 76B of the crimp rings 76 are fit into the crimp ring fitting grooves 43.

Figure 9:
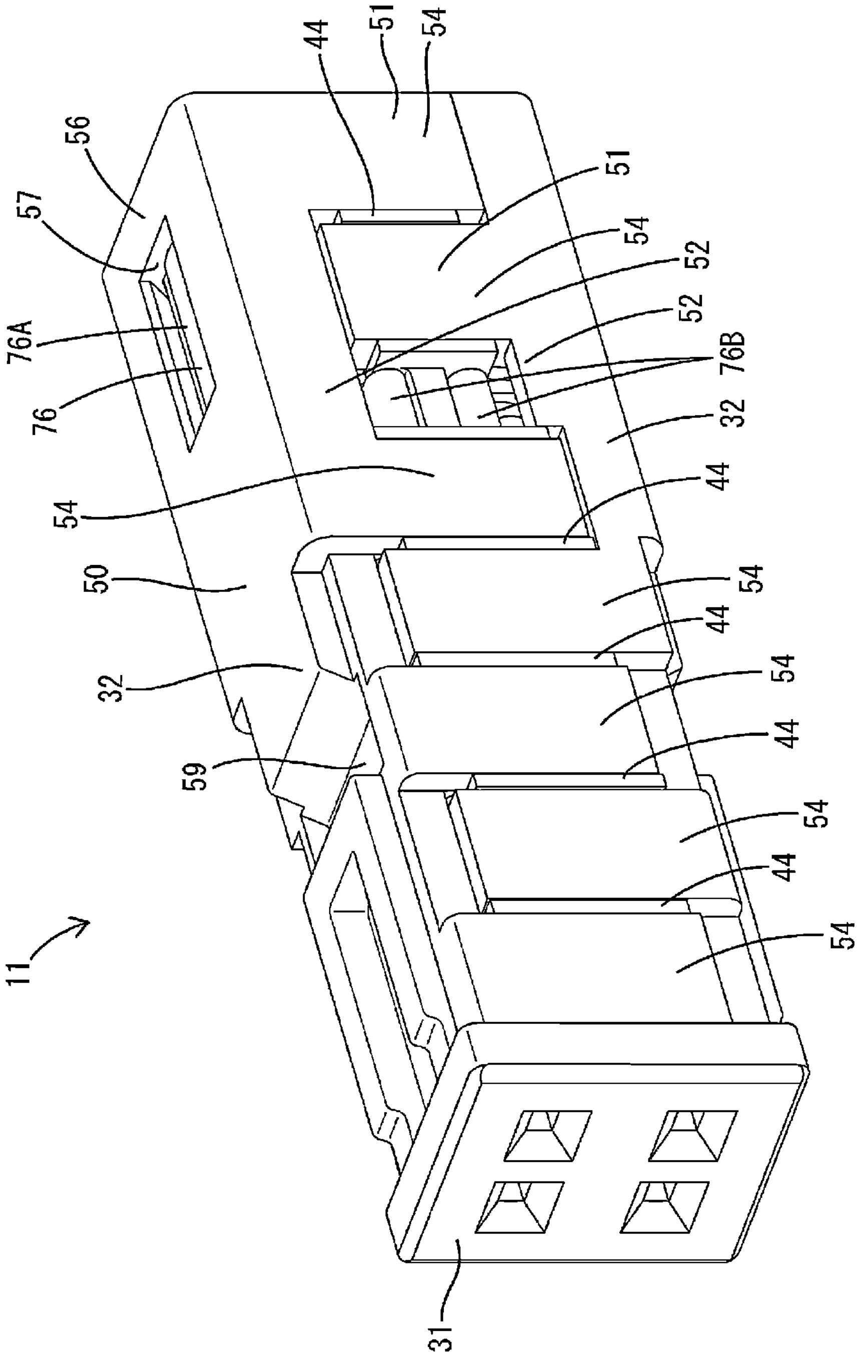
FIG. 9 is a perspective view in a state where the cover members are assembled on both sides of the base member.

Subsequently, as shown in FIG. 8, the cover member 32 is assembled with the base member 31 from above. In assembling the cover member 32 with the base member 31, the locking portions 51 are slid along the guide portions 44 on the first tapered surfaces 41A of the first lock receiving portions 41 and locked to the first lock receiving surfaces 41B. In this way, the cover member 32 is assembled with the base member 31. Similarly, the other cover member 32 is also assembled with the base member 31 as shown in FIG. 9.

Figure 11:
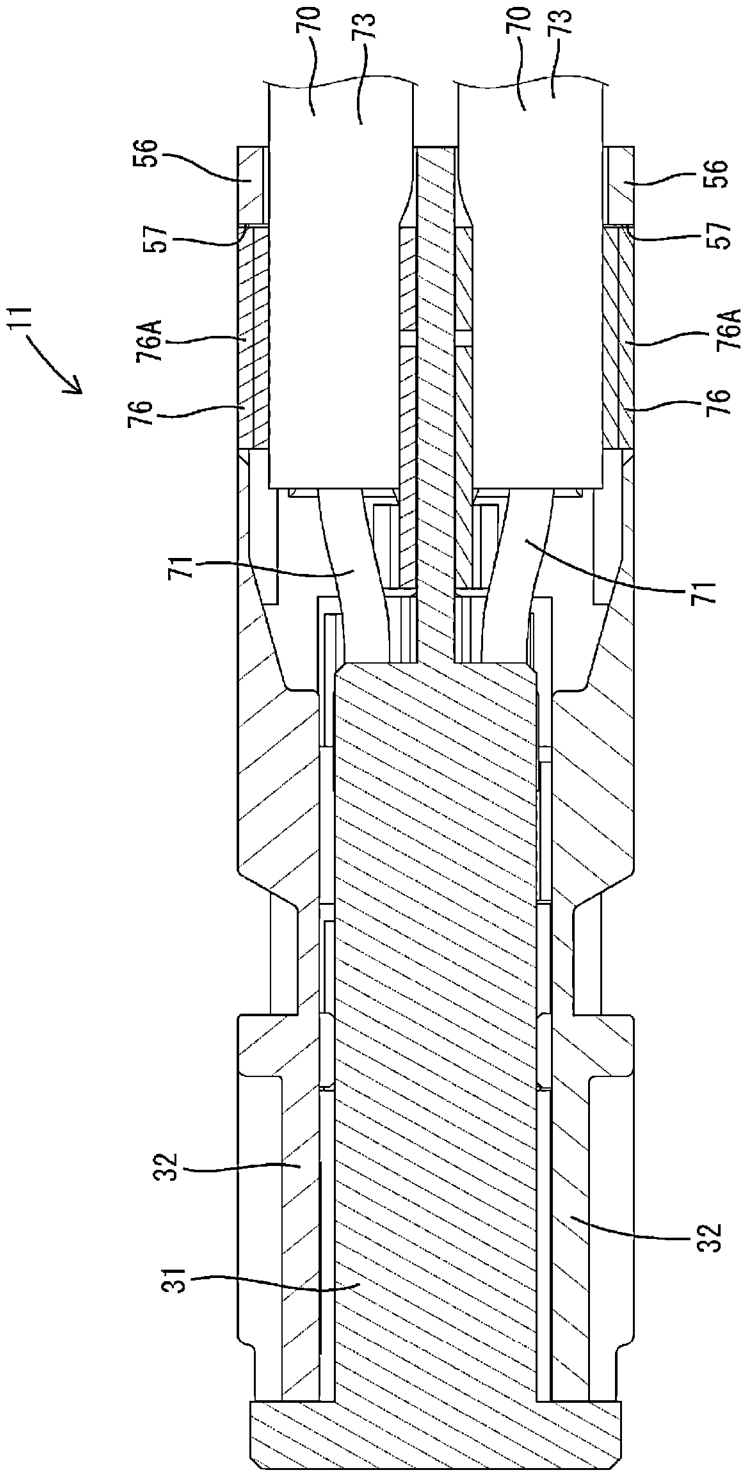
FIG. 11 is a side view in section of the inner module cut along a virtual plane passing through a crimping portion and a fitting hole.

With the cover member 32 assembled with the base member 31, the positioning portion 76B of the crimp ring 76 is arranged between the bottom surface of the crimp ring fitting groove 43 and the crimp ring restricting portions 52 of the cover member 32 and an upward movement is restricted as shown in FIG. 8. Further, as shown in FIG. 10, the front stabilizers 61A of the terminals 60 are fit into the front retaining recesses 50A of the cover members 32 and the rear stabilizers 61B of the terminals 60 are fit into the rear retaining recesses 50 of the cover members 32. Further, as shown in FIG. 11, the deflection restricting portions 56 of the cover members 32 are arranged outside the cables 70 in the vertical direction. Since the deflection restricting portions 56 are connected to the locking portions 51, outward movements of the cables 70 in the vertical direction are restricted. Further, as shown in FIG. 11, the crimping portions 76A of the crimp rings 76 are fit in the fitting holes 57 of the cover members 32. In this way, the terminal groups 22 are restricted from coming out rearward. By assembling the pair of cover members 32 on both sides of the base member 31 in this way, the inner module 11 is completed.

Subsequently, the inner module 11 is inserted into the accommodation chamber 84 of the outer housing 12 from behind. Before the inner module 11 is inserted, the retainer 13 is temporarily locked to the outer housing 12. In an insertion process, the resilient retaining piece 85 is resiliently deformed due to interference with the inner module 11 (front wall 48 of the base member 31). If the inner module 11 is further inserted thereafter, the resilient retaining piece 85 resiliently returns and is locked to the rear surface of the front wall 48 (primary locking).

After the inner module 11 is inserted in a proper posture into the outer housing 12, the retainer 13 is completely locked to the outer housing 12 as shown in FIG. 13. The retainer-side protrusion 13C is locked to an outer recess 59 of the cover member 32 (secondary locking). In this way, the inner module 11 is restricted from coming out from the outer housing 12.

Figure 14:
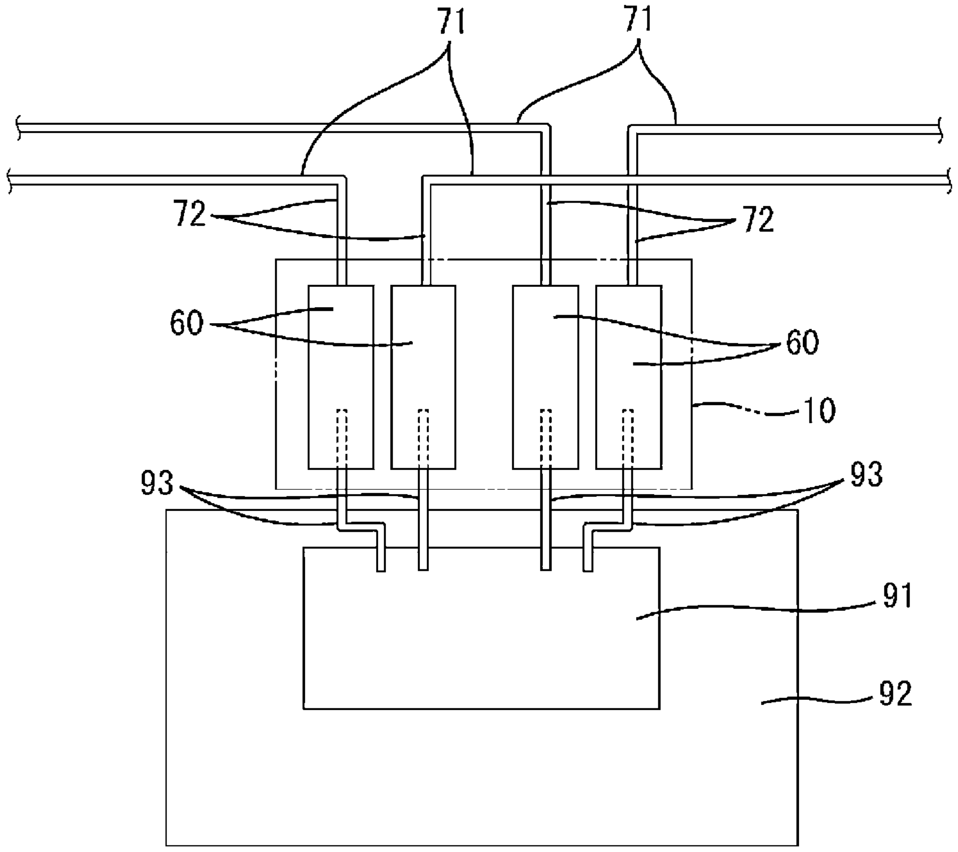
FIG. 14 is a configuration diagram of a branch structure using the connector.

FIG. 14 shows an application example of the connector 10. As shown in FIG. 14, the connector 10 is connected to the middle of a trunk harness constituted by the pair of electrically conductive paths 71. The connector 10 has a function of branching a communication circuit 91 from the trunk harness. The communication circuit 91 is formed as a printed circuit on a circuit board 92. An unillustrated board connector is mounted on the circuit board 92. The board connector is configured such that two pairs of tab-like branch-side terminals 93 are mounted in an unillustrated board-side housing to be fixed to the circuit board 92. The branch-side terminals 93 are connected to the communication circuit 91. If the connector 10 is connected to the board connector, the communication circuit 91 is branched from the trunk harness.

Effects of Embodiment

As described above, according to the connector 10 of the present disclosure, the outer housing 12 is configured such that the inner module 11 including the plurality of terminal groups 22 is accommodated in the single accommodation chamber 84. Thus, it is not necessary to provide a partition wall for partitioning a space in the accommodation chamber 84 (wall for partitioning the plurality of terminal groups 22 in an arrangement direction) to separately accommodate the plurality of terminal groups 22. Thus, the connector 10 can be reduced in size in the arrangement direction of the plurality of terminal groups 22. Further, since the insertion openings 48A corresponding to all the terminals 60 are formed in the front wall 84, which is one member, according to this configuration, position shifts of the insertion openings 48A can be prevented.

Further, the first tapered surfaces 41A of the first lock receiving portions 41 and the second tapered surfaces 42A of the second lock receiving portions 42 are respectively inclined along the assembly direction of the cover member 32 in a front view, and directions of inclination are opposite to each other. Thus, an operation of assembling the pair of cover members 32 with the base member 31 from mutually opposite directions can be facilitated.

Further, the base member 31 includes the guide portions 44 provided along the assembly direction of the cover members 32. Thus, in assembling the cover member 32 with the base member 31, the cover member 32 can be guided by the guide portions 44.

Further, the locking portions 51 are comb-shaped. Thus, even if the inner housing 21 is small in size, the cover member 32 is locked to the base member 31 at a plurality of positions. Therefore, the cover member 32 is hardly detached even if a force is applied in a direction to separate the cover member 32 and the base member 31 from each other.

Further, the first and second lock receiving portions 41, 42 are arranged in such a positional relationship as to be point-symmetrical with each other in a front view. Thus, the pair of cover members 32 can be members common to each other.

Further, the cover member 32 includes the locking portions 51 to be locked to the base member 31 and the deflection restricting portion 56 connected to the locking portions 51 and located to sandwich the cable 70 connected to the terminal group 22 between the partitioning portion 40 and the deflection restricting portion 56. Thus, the deflection of the cable 70 toward a side opposite to the partitioning portion 40 can be restricted.

Further, the terminal group 22 includes the crimping portion 76A to be crimped to the cable 70, and the cover member 32 includes the fitting hole 57, into the crimping portion 76A is fit, in front of the deflection restricting portion 56. By fitting the crimping portion 76A into the fitting hole 57, the cable 70 connected to the terminal group 22 can be suppressed from coming out rearward.

Other Embodiments

The present invention is not limited to the above described and illustrated embodiment, but is represented by claims. The present invention is intended to include all changes in the scope of claims and in the meaning and scope of equivalents and also include the following embodiments.

Although the first lock receiving portions have the first tapered surfaces and the second lock receiving portions have the second tapered surfaces in the above embodiment, the first and second lock receiving portions may have no tapered surface.

Although the connector includes the guide portions in the above embodiment, the guide portions may not be included.

Although the locking portion is comb-shaped in the above embodiment, the locking portion may not be comb-shaped.

Although the first and second lock receiving portions are arranged in such a positional relationship as to be point-symmetrical with each other in the above embodiment, the first and second lock receiving portions may not be arranged in such a positional relationship as to be point-symmetrical with each other.

Although the cover member includes the deflection restricting portion in the above embodiment, the deflection restricting portion may not be included.

Although the cover member includes the fitting hole, into which the crimping portion is fit, in the above embodiment, the fitting hole may not be included.

LIST OF REFERENCE NUMERALS

10 . . . connector
11 . . . inner module
12 . . . outer housing
13 . . . retainer
13A . . . bottom wall
13B . . . side wall
13C . . . retainer-side protrusion
13D . . . retainer-side recess
13E . . . retainer-side locking portion
21 . . . inner housing
22 . . . terminal group
31 . . . base member
32 . . . cover member
40 . . . partitioning portion
41 . . . first lock receiving portion
41A . . . first tapered surface (tapered surface)
41B . . . first lock receiving surface
42 . . . second lock receiving portion
42A . . . second tapered surface (tapered surface)
42B . . . second lock receiving surface
43 . . . crimp ring fitting groove
44 . . . guide portion
46 . . . terminal accommodation groove
47 . . . separation wall
48 . . . front wall
48A . . . insertion opening
50 . . . cover body
50A . . . front retaining recess
50B . . . rear retaining recess
51 . . . locking portion
52 . . . crimp ring restricting portion
54 . . . locking arm
55 . . . claw portion
56 . . . deflection restricting portion
57 . . . fitting hole
59 . . . outer recess
60 . . . terminal
61 . . . rectangular tube portion
61A . . . front stabilizer
61B . . . rear stabilizer
62 . . . terminal-side crimping portion
70 . . . cable
71 . . . electrically conductive path
72 . . . divided portion
73 . . . insulation coating
74 . . . conductor
75 . . . sheath
76 . . . crimp ring

76A . . . crimping portion
76B . . . positioning portion
81 . . . side wall portion
81A . . . first locked portion
81B . . . second locked portion
82 . . . bottom wall portion
83 . . . upper wall portion
84 . . . accommodation chamber
85 . . . resilient retaining piece
86 . . . lock arm
91 . . . communication circuit
92 . . . circuit board
93 . . . branch-side terminal

What is claimed is:

1. A connector, comprising:
an inner module including a plurality of terminal groups to be respectively connected to a pair of electrically conductive paths and each having a pair of terminals; and
an outer housing for accommodating the inner module,
the outer housing including only one accommodation chamber for accommodating the inner module,
the inner module including an integrally configured inner housing supporting the plurality of terminal groups,
the inner housing including a front wall to be arranged in front of the plurality of terminal groups,
the front wall being constituted by one member, the front wall being formed with insertion openings at positions respectively corresponding to all the terminals,
the inner housing including a base member having a partitioning portion for partitioning the plurality of terminal groups and a pair of cover members to be assembled with the base member to sandwich the base member from both upper and lower sides,
the first cover member on the upper side, out of the pair of cover members, including a first cover body and a first locking portion,
the first locking portion including first locking arms extending downward from both left and right sides of the first cover body,
the second cover member on the lower side, out of the pair of cover members, including a second cover body and a second locking portion,
the second locking portion including second locking arms extending upward from both left and right sides of the second cover body,
the base member including first lock receiving portions arranged along the first locking arms and second lock receiving portions arranged along the second locking arms,
the first and second lock receiving portions being alternately arranged in a front-rear direction,
the first and second lock receiving portions respectively extending both upward and downward from both left and right sides of the partitioning portion,
the first locking arms being locked to lower end parts of the first lock receiving portions, and
the second locking arms being locked to upper end parts of the second lock receiving surfaces.

2. The connector of claim 1, wherein the first and second lock receiving portions have tapered surfaces inclined in mutually opposite directions.

3. The connector of claim 2, wherein the base member includes a guide portion provided along an assembly direction of the cover members.

4. The connector of claim 2 or 3, wherein the locking portion is comb-shaped.

5. The connector of claim 4, wherein the first and second lock receiving portions are arranged in such a positional relationship as to be point-symmetrical with each other in a front view.

6. The connector of claim 5, wherein:
the cover member includes a locking portion to be locked to the base member and a deflection restricting portion connected to the locking portion and located to sandwich a cable connected to the terminal group between the partitioning portion and the deflection restricting portion.

7. The connector of claim 6, wherein:
the terminal group includes a crimping portion to be crimped to the cable, and
the cover member includes a fitting hole in front of the deflection restricting portion, the crimping portion being fit into the fitting hole.

8. The connector of claim 1 or 2, wherein:
the cover member includes a locking portion to be locked to the base member and a deflection restricting portion connected to the locking portion and located to sandwich a cable connected to the terminal group between the partitioning portion and the deflection restricting portion.

* * * * *